United States Patent
Swinkels et al.

(10) Patent No.: US 9,838,763 B2
(45) Date of Patent: Dec. 5, 2017

(54) TDM NETWORK CALL WITH COMPOUND SERVICE LAYER AGREEMENT

(71) Applicant: Ciena Corporation, Hanover, MD (US)

(72) Inventors: Gerard Leo Swinkels, Ottawa (CA); Serge Asselin, Kanata (CA); Ryan Paul Amenta, Carleton Place (CA); Marco A. Naveda, Manotick (CA)

(73) Assignee: Ciena Corporation, Hanover, MD (US)

( * ) Notice: Subject to any disclaimer, the term of this patent is extended or adjusted under 35 U.S.C. 154(b) by 238 days.

(21) Appl. No.: 14/751,591

(22) Filed: Jun. 26, 2015

(65) Prior Publication Data

US 2016/0380818 A1    Dec. 29, 2016

(51) Int. Cl.
*H04Q 11/00* (2006.01)
*H04J 3/16* (2006.01)

(52) U.S. Cl.
CPC ........ *H04Q 11/0066* (2013.01); *H04J 3/1652* (2013.01); *H04J 3/1658* (2013.01); *H04J 2203/006* (2013.01); *H04J 2203/0058* (2013.01); *H04J 2203/0067* (2013.01)

(58) Field of Classification Search
CPC ....... H04Q 11/0005; H04Q 2011/0045; H04Q 2011/002; H04Q 11/0066; H04J 14/08; H04J 3/1652; H04J 3/1658; H04J 2203/0058; H04J 2203/006; H04J 2203/0067
See application file for complete search history.

(56) References Cited

U.S. PATENT DOCUMENTS

| | | |
|---|---|---|
| 6,795,394 B1 | 9/2004 | Swinkels et al. |
| 8,160,453 B1 | 4/2012 | Harley et al. |
| 8,402,121 B2 | 3/2013 | Skalecki et al. |
| 8,553,707 B2 | 10/2013 | Swinkels et al. |
| 8,750,706 B2 | 6/2014 | Boertjes et al. |
| 8,854,955 B2 | 10/2014 | Prakash et al. |
| 2001/0038473 A1* | 11/2001 | Li .............. H04B 1/74 398/3 |
| 2011/0222394 A1* | 9/2011 | Swinkels ............ H04L 47/10 370/217 |
| 2011/0280580 A1* | 11/2011 | Wexler ............... H04L 45/22 398/79 |

(Continued)

OTHER PUBLICATIONS

Mannie, "Generalized Multi—Protocol Label Switching (GMPLS) Architecture," Memo:Network Working Group, Oct. 2004, pp. 1-138.

(Continued)

*Primary Examiner* — Ted Wang
(74) *Attorney, Agent, or Firm* — Clements Bernard Walker PLLC; Christopher L. Bernard; Lawrence A. Baratta, Jr.

(57) ABSTRACT

A method, implemented in a network with a control plane, is described for creating a compound Service Level Agreement (SLA) call for a Time Division Multiplexing (TDM) service in the network. The method includes creating the call with a non-preemptible component and a preemptible component, the compound SLA comprising the non-preemptible component and the preemptible component; implementing endpoints for the call at a source node and a destination node; and responsive to a preemption event in the network, removing the preemptible component at the endpoints. A node and network are also described.

20 Claims, 6 Drawing Sheets

(56) References Cited

U.S. PATENT DOCUMENTS

2013/0308949 A1   11/2013   Swinkels et al.
2014/0147107 A1   5/2014   Swinkels et al.

OTHER PUBLICATIONS

"Network node interface for the synchronous digital hierarchy (SDH)," International Telecommunication Union, Jan. 2007, pp. 1-196.
"Characteristics of synchronous digital hierarchy (SDH) equipment functional blocks," International Telecommunication Union, Mar. 2006, pp. 1-288.
"Generic functional architecture of transport networks," International Telecommunication Union, Mar. 2000, pp. 1-58.
"Hitless adjustment of ODUflex(GFP)," International Telecommunication Union, Oct. 2011, pp. 1-44.
"Architecture for the automatically switched optical network," International Telecommunication Union, Feb. 2012, pp. 1-124.
"Multi-technology network management: Information agreement (TMF608)," International Telecommunication Union, Mar. 2007, pp. 1-20.
"Multi-technology network management: CORBA IDL solution set (TMF814) with implementation statement templates and guidelines (TMF814A)," International Telecommunication Union, Mar. 2007, pp. 1-28.

* cited by examiner

TDM NETWORK CALL WITH COMPOUND SERVICE LAYER AGREEMENT

FIELD OF THE DISCLOSURE

The present disclosure generally relates to networking systems and methods. More particularly, the present disclosure relates to providing network calls, in a network with a control plane, with compound Service Layer Agreements (SLAs).

BACKGROUND OF THE DISCLOSURE

Time Division Multiplexing (TDM)-based services include Optical Transport Network (OTN), Synchronous Optical Network (SONET), Synchronous Digital Hierarchy (SDH), etc. services. TDM-based services are circuit-oriented where a service provider establishes a service for a customer with a particular SLA, and can be referred to as Layer 1 as well. Because of the circuit-oriented nature, TDM-based services are guaranteed. This can be contrasted with packet-based services that can have a particular SLA with guaranteed and burst/excess traffic, i.e., a Committed Information Rate (CIR) and Excess Information Rate (EIR). That is, packet-based services, due to the nature of packet-based networks which can utilize statistical multiplexing, can have a compound SLA meaning they can have a guaranteed rate (CIR) as well as a preemptible, excess, or burst rate (EIR). A compound SLA, as used herein, is where a call in a network has more than one SLA attribute; the simplest example is having a guaranteed rate and a preemptible or best effort rate. Conventionally, TDM-based services are either guaranteed or preemptible; there is no statistical multiplexing in TDM-based services. In the preemptible case, TDM-based services can be provided until a guaranteed TDM-based service pre-empts, such as due to a redial upon a fault in the network. Conventionally, TDM-based services do not allow multiple types of SLAs for a same call, i.e., there are no conventional techniques to allow compound SLAs for TDM-based services. As TDM-based services evolve with control plane control, it would be advantageous to support varying levels of SLAs for a single call, i.e., a heterogeneous SLA.

BRIEF SUMMARY OF THE DISCLOSURE

In an exemplary embodiment, a method, implemented in a network with a control plane, is described for creating a compound Service Level Agreement (SLA) call for a Time Division Multiplexing (TDM) service in the network. The method includes creating the call with a non-preemptible component and a preemptible component, the compound SLA including the non-preemptible component and the preemptible component; implementing endpoints for the call at a source node and a destination node; and, responsive to a preemption event in the network, removing the preemptible component at the endpoints. Link Capacity Adjustment Scheme (LCAS) can be used to manage removing the preemptible component at the endpoints. End-to-end call adjustment messages in the control plane can be used to manage removing the preemptible component at the endpoints. The TDM service can be implemented and managed, in the control plane, with heterogeneous attributes including the compound SLA. The TDM service can be an Optical Transport Network (OTN) connection, and wherein each of the non-preemptible component and the preemptible component can include one or more Optical channel Data Units (ODU)-based connections. The call can be an association between two or more users in the network, and the call is associated with zero or more connections in the network, each of the non-preemptible component and the preemptible component are formed by the zero or more connections. The zero or more connections can be either Subnetwork Connections (SNCs) or Label Switched Paths (LSPs). The call can be utilized to provide router connectivity, each of the endpoints can be communicatively coupled to a router, and wherein the source node and the destination node can be configured to turn off ports facing the router when removing the preemptible component at the endpoints. The can be is utilized to provide router connectivity, each of the endpoints can be communicatively coupled to a router, and wherein a Link Aggregation Group (LAG) can be implemented with the non-preemptible component and the preemptible component. The call can be managed by the control plane with a plurality of Connection Termination Points (CTPs), the non-preemptible component has one or more CTPs set to no preemption and the preemptible component has one or more CTPs set to preemption.

In another exemplary embodiment, a node, in a network with a control plane, is configured to create a compound Service Level Agreement (SLA) call for a Time Division Multiplexing (TDM) service in the network. The node includes one or more ports communicatively coupled to the network; and a controller configured to create the call with a non-preemptible component and a preemptible component, the compound SLA including the non-preemptible component and the preemptible component, implement an endpoint for the call, wherein a corresponding node at another end of the call is configured to also implement the endpoint for the call, and responsive to a preemption event in the network, remove the preemptible component at the endpoints. Link Capacity Adjustment Scheme (LCAS) can be used to manage removing the preemptible component at the endpoints. End-to-end call adjustment messages in the control plane can be used to manage removing the preemptible component at the endpoints. The TDM service can be implemented and managed, in the control plane, with heterogeneous attributes including the compound SLA. The TDM service can be an Optical Transport Network (OTN) connection, and wherein each of the non-preemptible component and the preemptible component can include one or more Optical channel Data Units (ODU)-based connections. The call can be an association between two or more users in the network, and the call can be associated with zero or more connections in the network, each of the non-preemptible component and the preemptible component are formed by the zero or more connections. The call can be utilized to provide router connectivity, each of the endpoints can be communicatively coupled to a router, and wherein the source node and the destination node can be configured to turn off ports facing the router when removing the preemptible component at the endpoints. The call can be utilized to provide router connectivity, each of the endpoints can be communicatively coupled to a router, and wherein a Link Aggregation Group (LAG) can be implemented with the non-preemptible component and the preemptible component. The call can be managed by the control plane with a plurality of Connection Termination Points (CTPs), the non-preemptible component has one or more CTPs set to no preemption and the preemptible component has one or more CTPs set to preemption.

In a further exemplary embodiment, a network is described with a control plane, wherein the network is configured to support a compound Service Level Agreement (SLA) call for a Time Division Multiplexing (TDM) service. The network includes a plurality of interconnected nodes; wherein the call is created with a non-preemptible component and a preemptible component, the compound SLA including the non-preemptible component and the preemptible component, wherein a source node and a destination node of the plurality of interconnected nodes are each configured to implement an endpoint for the call, and wherein, responsive to a preemption event in the network, the source node and the destination node are each configured to remove the preemptible component at the endpoints.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to providing network calls, in a network with a control plane, with compound SLAs. A call, managed by a control plane, is a service association that is distinct from the infrastructure or realization mechanisms, i.e., the actual connections in the network. The present disclosure presents various techniques for Layer 1 or TDM-based calls to have a compound SLA, i.e., a single call with a non-preemptible or guaranteed component and a preemptible or best effort component. Thus, Layer 1 or TDM-based calls can have CIR and EIR rates similar to packet-based connections, without using statistical multiplexing. The present disclosure includes techniques to establish call endpoints at source and destination nodes in a fixed manner that is advantageous for rapid reconfiguration. When preemption occurs, such as due to rerouting or new call establishment of a call with higher priority, a deterministic part of the call is lost or destroyed (not arbitrarily). This call destruction allows the endpoints to rapidly reconfigure the call to a known good/alternate state, i.e., with the non-preemptible or guaranteed component, without having to resort to Optical channel Data Unit flex (ODUflex) Hitless adjustment (G.7044) or Virtual Concatenation (VCAT)/Link Capacity Adjustment Scheme (LCAS). In addition to the call destruction, the present disclosure contemplates reversion back when bandwidth is available to support the destroyed components.

Exemplary Control Plane Network

Figure 1:
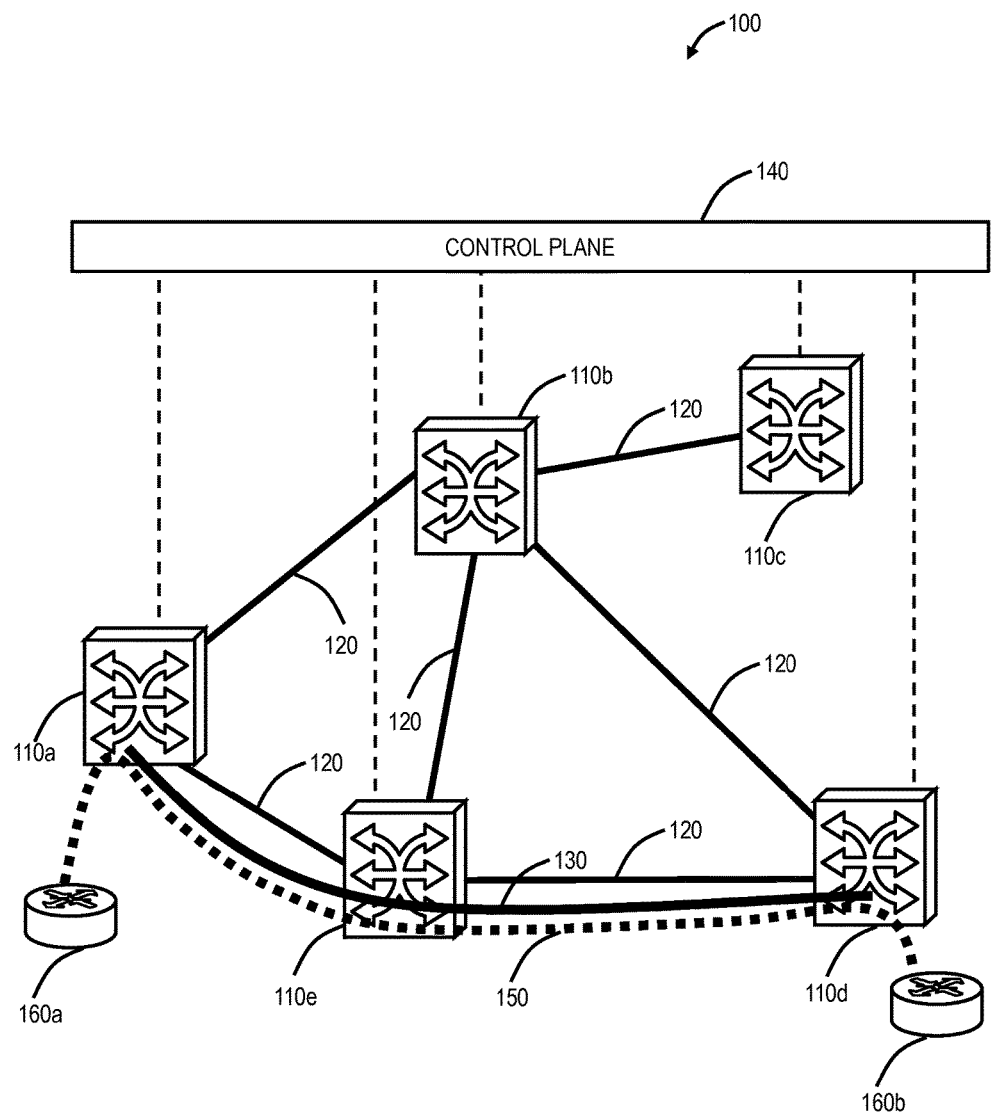
FIG. 1 is a network diagram of an exemplary control plane network with five interconnected nodes.
Figure 6:
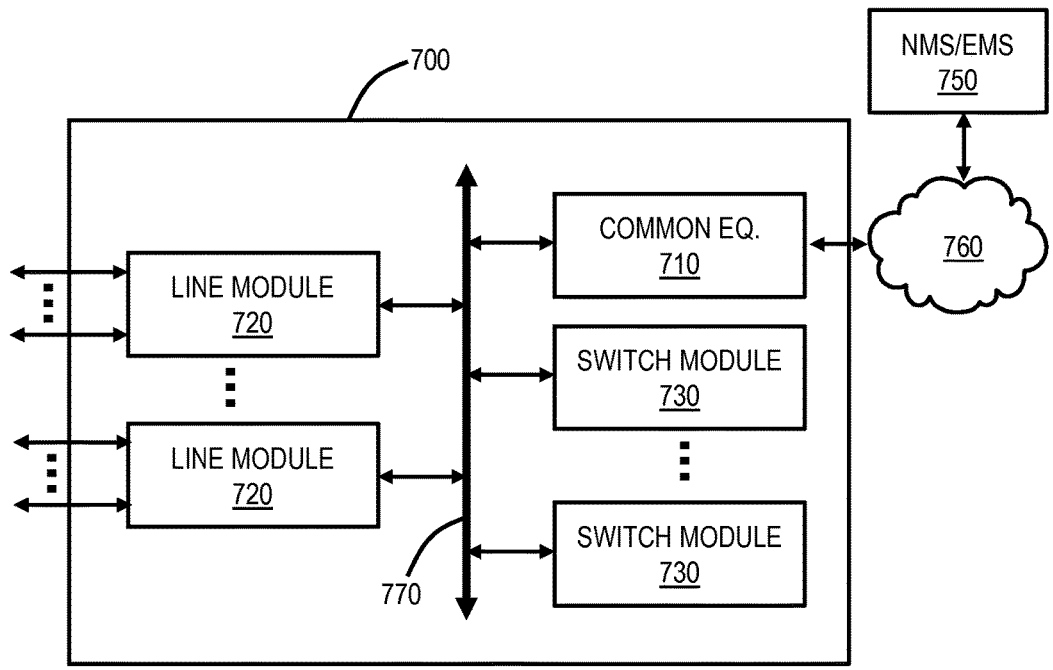
FIG. 6 is a block diagram of an exemplary node for use with the systems and methods described herein.

Referring to FIG. 1, in an exemplary embodiment, a network diagram illustrates an exemplary control plane network 100 with five interconnected nodes 110a, 110b, 110c, 110d, 110e. The nodes 110 are interconnected through a plurality of links 120. The nodes 110 communicate with one another over the links 120 through Layer 0, 1, and/or 2 (L0, L1, and/or L2) protocols. The nodes 110 can be network elements that include a plurality of ingress and egress ports forming the links 120. An exemplary node implementation is illustrated in FIG. 6. The network 100 includes a connection 130 with ingress/egress at the nodes 110a, 110c and intermediate nodes 110b, 110e. The connection 130 can be one or more connections at any of the L0, L1, and/or L2 protocols, such as a wavelength, a Subnetwork Connection (SNC), a Label Switched Path (LSP), etc. The connection 130 is an end-to-end signaled path. For purposes of the present disclosure, the connection 130 is TDM-based such as, for example, OTN (Optical channel Data Unit-n (ODUn), ODUflex, etc.), SONET (OC-48, OC-192, etc.), SDH (STM-16, etc.).

The nodes 110 can also be referred to interchangeably as network elements (NEs). The plane network 100 is illustrated, for example, as an interconnected mesh network, and those of ordinary skill in the art will recognize the network 100 can include other architectures, with additional nodes 110 or with fewer nodes 110, etc. The network 100 can include a control plane 140 operating on and/or between the nodes 110a, 110b, 110c, 110d, 110e. The control plane 140 includes software, processes, algorithms, etc. that control configurable features of the network 100, such as automating discovery of the nodes 110; capacity on the links 120; port availability on the nodes 110; connectivity between ports; management of the connection 130; call control and management; dissemination of topology and bandwidth information between the nodes 110; calculation and creation of paths for connections; network level protection and restoration; and the like.

Optical (i.e., transport) networks and the like (e.g., Wavelength division multiplexing (WDM), Synchronous Optical Network (SONET), Synchronous Digital Hierarchy (SDH), Optical Transport Network (OTN), Ethernet, and the like) at various layers are deploying control plane systems and methods. Control planes provide an automatic allocation of network resources in an end-to-end manner. Exemplary control planes may include Automatically Switched Optical Network (ASON) as defined in G.8080/Y.1304, Architecture for the automatically switched optical network (ASON) (02/2012), the contents of which are herein incorporated by reference; Generalized Multi-Protocol Label Switching (GMPLS) Architecture as defined in Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; Wavelength Switched Optical Network (WSON); or any other type control plane for controlling network elements at multiple layers, and establishing connections between the nodes 110. In an exemplary embodiment, the control plane 140 can utilize ASON, GMPLS, OSRP, WSON, or the like. Those of ordinary skill in the art will recognize the network 100 and the control plane 140 can utilize any control plane for controlling the nodes 110 and establishing calls between the nodes 110.

In the control plane 140, a call 150 is an association between two or more users, such as routers 160a, 160b, and one or more domains that supports an instance of a service through one or more domains. Within domains, the association is supported by network entities that contain call state. In FIG. 1, the network 100 is a single domain, and the call 150 can be provided over the connection 130 (or multiple connections). The call 150 does not provide the actual connectivity for transmitting traffic, but only builds a relationship by which the connections 130 may be made. In GMPLS, the connections 130 are known as Label Switched Paths (LSPs), and in ASON/OSRP, the connections 130 are known as Subnetwork Connections (SNCs). All of these control planes 140 include mechanisms to support calls. For example, GMPLS can use Resource Reservation Protocol-Traffic Engineering (RSVP-TE) signaling to support calls. ASON describes the separation between the call 150 and connection controllers in G.8080/Y.1304. Call and connection control separation allows for the call 150 to have multiple connections 130 associated with it (as well as having no connection associated with it).

The present disclosure focuses on enabling a compound level SLA in the call 150 where the call 150 is TDM-based, in the control plane 140. The present disclosure contemplates the control plane 140 as ASON, GMPLS, OSRP, etc. The compound level SLA in the call 150 allows a TDM-based service to be specified like a packet service. Of course, it is not possible to oversubscribe the capacity in a TDM-based service, but the excess bandwidth typically reserved for redials (protection capacity) can be used and assigned to a single service. This is in contrast to a conventional operation where a TDM-based service is homogenous—either guaranteed as a whole or best effort as a whole. Now, a TDM-based service can be heterogeneous—part guaranteed and part best effort, like a packet service.

Compound SLA Process for TDM-Based Calls

Figure 2:
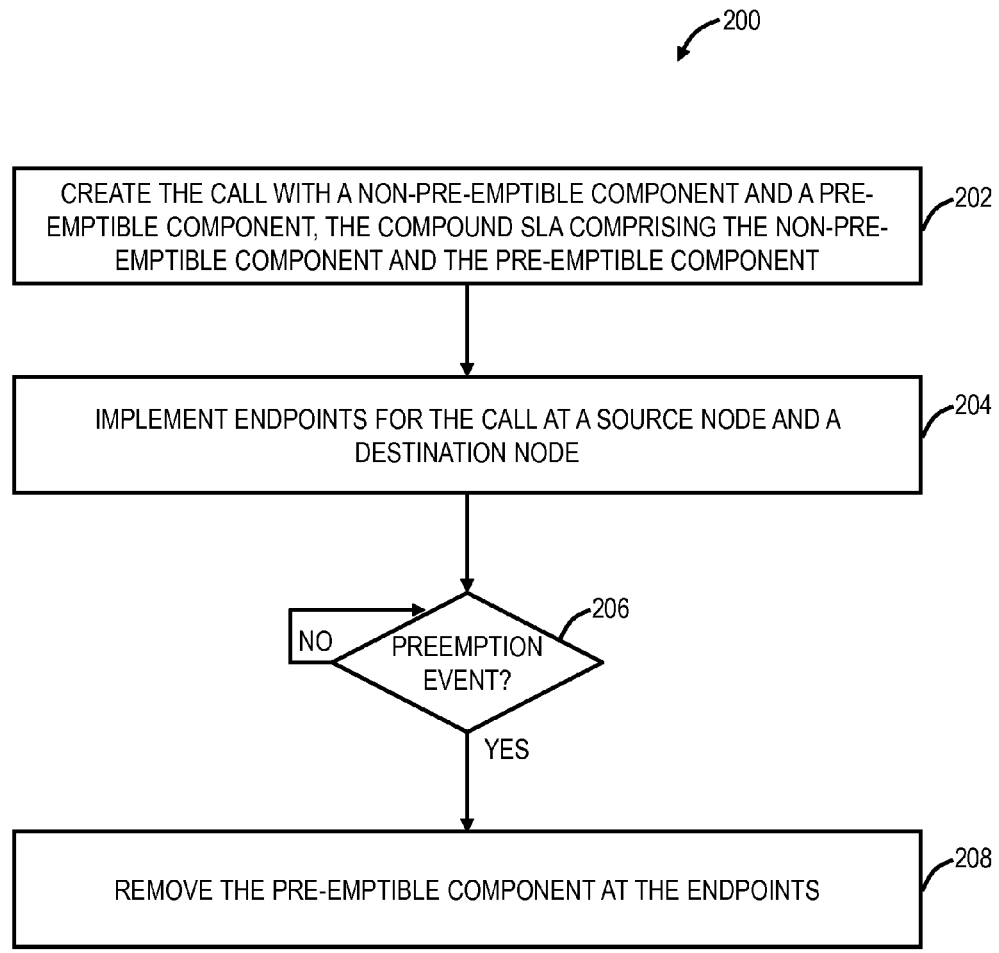
FIG. 2 is a flowchart of a compound SLA process for TDM-based calls.

Referring to FIG. 2, in an exemplary embodiment, a flowchart illustrates a compound SLA process 200 for TDM-based calls. The process 200 is implemented in a network with a control plane, such as the network 100 with the control plane 140. The process 200 is for creating a compound Service Level Agreement (SLA) call for a Time Division Multiplexing (TDM) service in the network. The process 200 includes creating the call with a non-preemptible component and a preemptible component, the compound SLA includes the non-preemptible component and the preemptible component (step 202). When a new call is installed, it can include specification of guaranteed (the non-preemptible component) and extra traffic (the preemptible component). The process 200 includes implementing endpoints for the call at a source node and a destination node (step 204). The endpoints are constructed in the control plane in a fixed manner, advantageous for rapid reconfiguration. For example, the call is managed by the control plane with a plurality of Connection Termination Points (CTPs), the non-preemptible component has one or more CTPs set to no preemption and the preemptible component has one or more CTPs set to preemption. Responsive to a preemption event in the network (step 206), the process 200 includes removing the preemptible component at the endpoints (step 208). The preemption event can include a new call that has higher priority needing bandwidth occupied by the preemptible component, a redial due to a failure of a call that has higher priority needing bandwidth occupied by the preemptible component, etc.

The Link Capacity Adjustment Scheme (LCAS) can be used to manage removing the preemptible component at the endpoints. Alternatively, end-to-end call adjustment messages in the control plane can be used to manage removing the preemptible component at the endpoints. That is, if hardware at the source and destination nodes support LCAS, the hardware can manage the lost bandwidth for the preemptible component based on the preemption event. The call can use Virtual Concatenation (VCAT), the non-preemptible component can be viewed a CIR, and the preemptible component can be viewed as EIR. The first VCAT sequence numbers are assigned for CIR, then following sequence numbers are assigned for the next least likely to be preempted. The last sequence numbers assigned are used by connections in the preemptible component most likely to be preempted. If the hardware supports LCAS, then there is nothing to do to manage removing the preemptible component, i.e., LCAS performs the management.

In the case of no LCAS support, the preemptible component is removed as a unit. VCAT re-sequencing is complex; it is easier to release the bandwidth than to re-sequence. Some hardware may not be able to handle the removal of sequence numbers. Here, a complete delete and re-add up to but not including the failed sequence number is required. Fortunately, this can be done as an atomic operation. Also, to add back the EIR/the preemptible component, the VCAT sequence numbers can be added back; this is a simple operation if VCAT re-sequencing is not required. Note, the CIR connections can be added in first followed by the EIR connections, then the EIR is easily removed or added and re-sequencing is avoided.

The TDM service can include a non-preemptible component (CIR connections) and a preemptible component (EIR connections). From the perspective of sequence numbers, in an exemplary embodiment, the non-preemptible component (CIR connections) are given sequence numbers from a separate and distinct set from the preemptible component (EIR connections). This leads to an arrangement where the CIR connections all have sequence numbers less than the EIR connections. This further avoids a need to re-sequence when EIR connections are dropped, i.e., preempted. The sequence numbers for the EIR connections are contiguous, but not necessarily sequential.

The TDM service is implemented and managed, in the control plane, with heterogeneous attributes including the compound SLA. The TDM service can be an Optical Transport Network (OTN) connection, and each of the non-preemptible component and the preemptible component can include one or more Optical channel Data Units (ODU)-based connections. Again, the call is an association between two or more endpoints in the network, and the call is associated with zero or more connections in the network, each of the non-preemptible component and the preemptible component are formed by the zero or more connections which can be either Subnetwork Connections (SNCs) or Label Switched Paths (LSPs). Optionally, the call can be utilized to provide router connectivity, each of the endpoints is communicatively coupled to a router, and the source node and the destination node are configured to turn off ports facing the router when removing the preemptible component at the endpoints. Alternatively, the call can be utilized to provide router connectivity, each of the endpoints is communicatively coupled to a router, and a Link Aggregation Group (LAG) is implemented with the non-preemptible component and the preemptible component.

Exemplary IP Network Implementation

The compound SLA can be used, for example, in providing more efficient packet networks, i.e., IP networks. The driver for the compound SLA is that when all capacities from the routers 160a, 160b to the network 100 are protected, the additional throughput available under normal operating conditions (i.e., no failures) used for unprotected IP services is gone. Under any underlying failure, there is less headroom for traffic adjustment/tuning as well as accommodating any ad-hoc requirement unless all the backup/protected capacities are all assigned to IP. If all protected/backup capacities are assigned to IP as the priority, the compound SLA can be used to achieve the overall bandwidth efficiency gain and savings. With the compound SLA, the optical connections in the network 100 can be provisioned, in the control plane 140, as either preemptible or non-preemptible. An IP network, over the optical connections, could be constructed using a mix of preemptible or non-preemptible circuits. This allows all spare network capacity to be assigned to the IP network under normal working conditions while giving the network 100 the flexibility to use some of the IP capacity to protect Layer 1 traffic optically when required.

The IP network can be sized from a circuit capacity standpoint with sufficient non-preemptible bandwidth to ensure IP layer survivability of all protected IP traffic. Incremental Layer 1 protection bandwidth and/or additional IP capacity deployed for lower priority internet traffic would be configured as preemptible bandwidth. Under fault scenarios (i.e., pre-emption events), some of the preemptible IP capacity could be re-assigned for optical protection. IP traffic affected by the faults would be protected at the IP layer using spare non-preemptible capacity.

The re-assignment of capacity could be done in one of two ways. First, preemptible capacity could be defined as entire IP circuits. Under pre-emption events, some circuits would disconnected entirely. Port conditioning by the control plane 140 would quickly alert the router to the interruption of the circuit, allowing the router to re-balance/re-route/prioritize IP traffic as necessary on remaining active ports. Second, IP capacity could be pre-empted at a sub IP circuit level, using hardware in the network 100 at the nodes 110. In this scenario, a router port/IP link could be throttled back rather than interrupted entirely, by dynamically reducing optical link capacity using either SONET/SDH VCAT/LCAS or OTN ODUflex re-sizing. From a router standpoint, all links (unaffected by faults), remain UP but throughput would be reduced on some links. The hardware interfacing with the router could be provisioned to prioritize packet traffic.

Figure 3A:
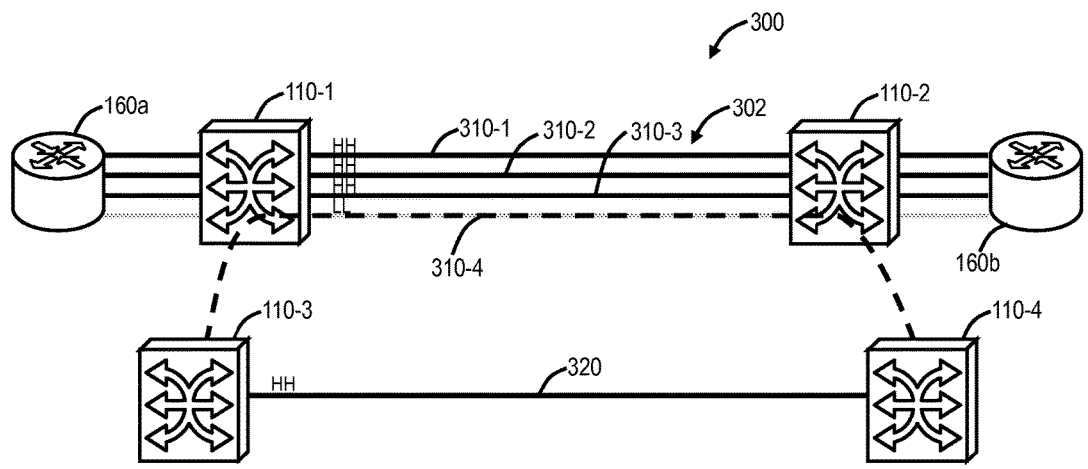
FIGS. 3A and 3B are network diagrams of a network with a compound SLA call, without preemption (FIG. 3A) and with preemption (FIG. 3B)
Figure 3B:
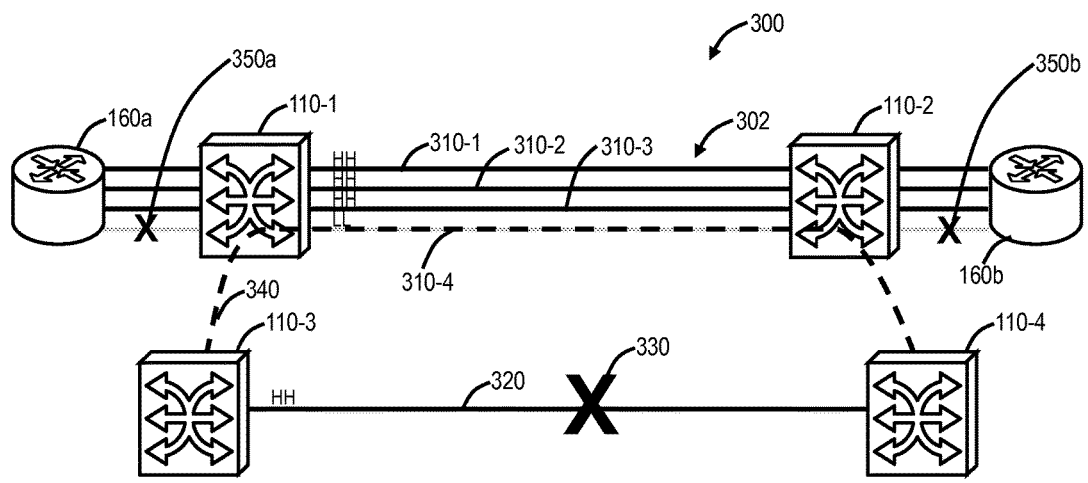

Referring to FIGS. 3A and 3B, in an exemplary embodiment, a network diagram illustrates a network 300 with a compound SLA call 302, without preemption (FIG. 3A) and with preemption (FIG. 3B). The network 300 includes routers 160a, 160b and nodes 110-1, 110-2, 110-3, 110-4. The call 302 is between the nodes 110-1, 110-2 and includes four connections 310-1, 310-2, 310-3, 310-4. The connections 310-1, 310-2, 310-3 are high-priority connections, i.e., the non-preemptible component, and the connection 310-4 is a low-priority connection, i.e., the preemptible component. Additionally, the network 300 includes another call 320 which is solely a high-priority connection. In this example, for redial, the call 320 will traverse the link between the nodes 110-1, 110-2, preempting the connection 310-4.

In an exemplary embodiment, the calls 302, 320 include OTN circuits, i.e., the connections 310 are OTN circuits, each of which is defined as low priority (preemptible) or high priority (not preemptible). The routers 160a, 160b can be an Internet Protocol (IP) network that is constructed using a mix of high and low priority circuits. The high priority circuits in the IP network are assigned to the connections 310-1, 310-2, 310-3, i.e., the non-preemptible component. The high priority circuits are determined based on ensuring throughput of high priority traffic, and the additional circuits are configured as a lower priority. Under normal working conditions (FIG. 3A), both the high and low priority circuits carry IP traffic, via all the connections 310. Under failure conditions (FIG. 3B), lower priority IP circuits may be interrupted to protect higher priority traffic impacted by failures. Specifically, responsive to a failure 330 affecting the call 320, a connection 340 associated with the call 320 redials, pre-empting the connecting 310-4. The nodes 110-1, 110-2 are configured to perform port conditioning by disabling their ports 350a, 350b interfacing the routers 160a, 160b for the connection 310-4 to signal to the routers 160a, 160b that the link is down. The ports 350a, 350b can be disabled by turning the lasers off. The routers 160a, 160b are configured automatically to prioritize higher priority traffic over a reduced IP topology and/or LAG groups.

Figure 4A:
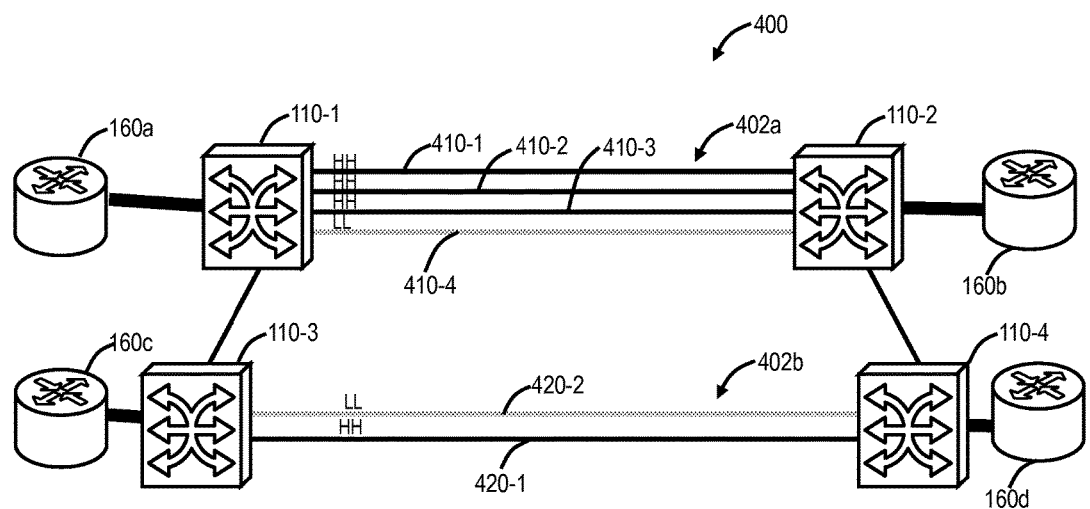
FIGS. 4A and 4B are network diagrams of a network with compound SLA calls, without preemption (FIG. 4A) and with preemption (FIG. 4B)
Figure 4B:
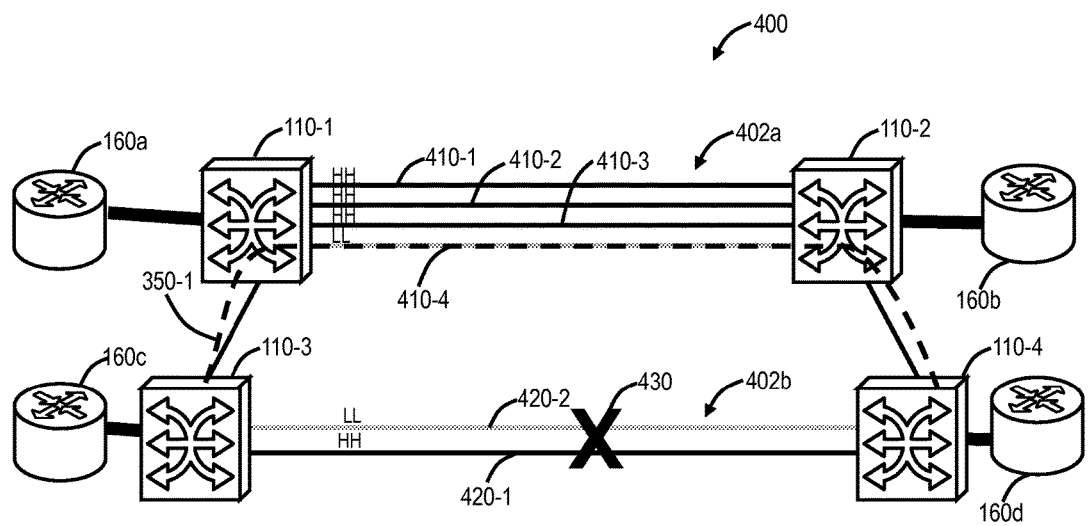

Referring to FIGS. 4A and 4B, in an exemplary embodiment, network diagram illustrates a network 400 with compound SLA calls 402a, 402b, without preemption (FIG. 4A) and with preemption (FIG. 4B). The network 400 includes routers 160a, 160b, 160c, 160d and nodes 110-1, 110-2, 110-3, 110-4. Similar to the call 302, the call 402a is between the nodes 110-1, 110-2 and includes four connections 410-1, 410-2, 410-3, 410-4. The connections 410-1, 410-2, 410-3 are high-priority connections, i.e., the non-preemptible component, and the connection 410-4 is a low-priority connection, i.e., the preemptible component. Additionally, the network 400 includes another call 402b that has two connections 420-1, 420-2, the connection 420-1 is a high-priority connection, and the connection 420-2 is a low-priority connection. In this example, for redial, the connections 410-4, 420-2 are low-priority that are preemptible. In FIG. 4B, there is a fault 430 which affects the call 402b. Here, the connection 420-1 redials between the nodes 110-1, 110-2, pre-empting the connection 410-4. The connection 420-2 does not redial.

Layer 1 Call Adaptation Point

Figure 5:
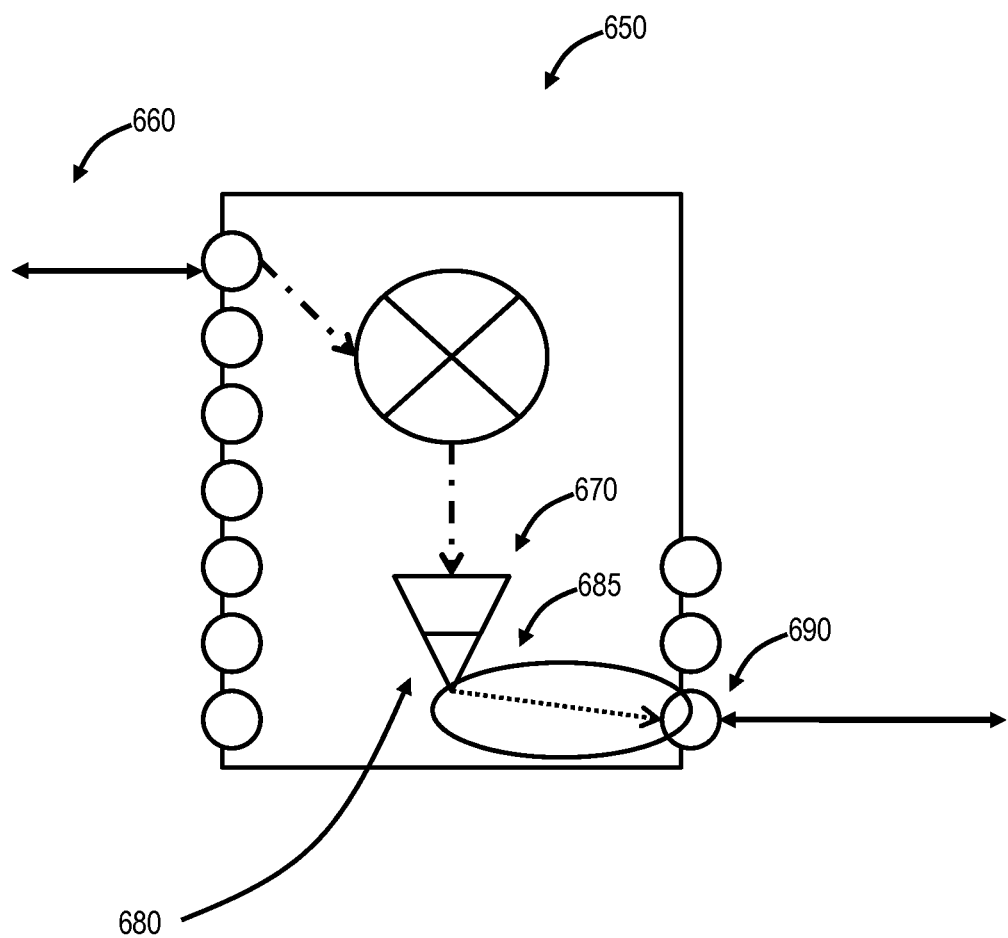
FIG. 5 is a block diagram of a call adaptation point.

Referring to FIG. 5, in an exemplary embodiment, a block diagram illustrates a call adaptation point 650. International Telecommunications Union (ITU) Recommendation G.805 (03/00) "Generic functional architecture of transport networks," the contents of which are incorporated by reference herein, defines a layered functional architecture for transport networks, such as the network 100. Based on the G.805 architecture, two models have been developed: G.8080 for the control plane (Automatically Switched Optical Network), and Tele-Management Forum (TMF) model TMF608/ITU Recommendation M.3170.2 "Multi-technology network management: Information agreement (TMF608)" (03/07) for the management plane, the contents of which are incorporated by reference herein. TMF814/ITU Recommendation M.3170.3 "Multi-technology network management: CORBA IDL solution set (TMF814) with implementation statement templates and guidelines (TMF814A)" (03/07) is an interface specification of TMF that instantiates the TMF608 model. G.8080 defines two types of call controllers: calling/called party call controllers (CCCs) and network call controllers (NCCs). Calling/called party call controllers initiate and terminate calls, whereas network call controllers interact with the CCCs and with connection controllers to manage connections within the network. Within the management plane, TMF814 provides an interface that uses the G.805 model of connections. The relationship between connections at different layers is known for the TMF814 interface. Thus, it can be used to manage multi-layer connections across the network.

G.8080 uses the existing definition of a logical separation between calls and connections. A "call" may be understood as an "agreement" or "intent" to communicate. Typically, the call will be represented by a call object that contains metadata concerning the call. Such metadata may, for example, include billing information; characteristic information (CI) of the call (e.g., transport protocol, bit rate, etc.); security parameters; and quality of service (QoS) requirements, including the compound SLA described herein for TDM-based calls. While a call represents an agreement to communicate, a "connection" provides the actual communication. Thus, for example, instantiation of a call object indicates a client's intent to communicate and provides the information required by network service providers to facilitate and manage the communications. On the basis of the call object, the network service provider(s) can then provide (such as through signaling protocols) the physical network resources (that is, the connections) required to transport the client traffic.

FIG. 5 illustrates a management plane view of the call adaptation point 650 for the compound SLA. The call adaption point 650 includes a single client service 660, which may be, for example, an Ethernet service. The single client service 610 is terminated and adapted by a service termination and adaptation function 670 to provide a Connection Termination Point (CTP) 680. A control plane call 685 can use more than one CTP 680 with more than one SLA (guaranteed, preemptible) for a TDM-based service to map the more than one CTP 680 to associated network ports 690, e.g., Trail Termination Points (TTPs) such as ODU TTPs. The call adaptation point 650 allows some of the CTPs 680 to be connected with 1 SLA (not preemptible) and other CTPs 680 to be connected with a different SLA (preemptible), hence the call 685 has a compound SLA.

Exemplary Network Element/Node

Referring to FIG. 6, in an exemplary embodiment, a block diagram illustrates an exemplary node 700 for implementing the compound SLA described herein. In an exemplary embodiment, the exemplary node 700 can be a network element that may consolidate the functionality of a Multi-Service Provisioning Platform (MSPP), Digital Cross Connect (DCS), Ethernet and/or Optical Transport Network (OTN) switch, Dense Wave Division Multiplexed (DWDM) platform, etc. into a single, high-capacity intelligent switching system providing Layer 0, 1, and/or 2 consolidation. In another exemplary embodiment, the node 700 can be any of an OTN Add/Drop Multiplexer (ADM), ROADM, a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 700 can be any digital system with ingress and egress digital signals and switching of channels, timeslots, tributary units, etc. and/or photonic system with ingress and egress wavelengths and switching (ROADM). While the node 700 is shown as an optical network element, the systems and methods contemplated for use with any switching fabric, network element, or network based thereon.

In an exemplary embodiment, the node 700 includes common equipment 710, one or more line modules 720, and one or more switch modules 730. The common equipment 710 can include power; a control module; operations, administration, maintenance, and provisioning (OAM&P) access; user interface ports; and the like. The common equipment 710 can connect to a management system 750 through a data communication network 760 (as well as a Path Computation Element (PCE), Software Defined Network (SDN) controller, OpenFlow controller, etc.). The management system 750 can include a network management system (NMS), element management system (EMS), or the like. Additionally, the common equipment 710 can include a control plane processor, such as a controller 800 illustrated in FIG. 7, configured to operate the control plane as described herein. The node 700 can include an interface 770 for communicatively coupling the common equipment 710, the line modules 720, and the switch modules 730 together. For example, the interface 770 can be a backplane, mid-plane, a bus, optical or electrical connectors, or the like. The line modules 720 are configured to provide ingress and egress to the switch modules 730 and external connections on the links to/from the node 700. In an exemplary embodiment, the line modules 720 can form ingress and egress switches with the switch modules 730 as center stage switches for a three-stage switch, e.g. a three-stage Clos switch. Other configurations and/or architectures are also contemplated. The line modules 720 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 720 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between. The line modules 720 can include wavelength division multiplexing interfaces, short reach interfaces, and the like, and can connect to other line modules 720 on remote network elements, end clients, edge routers, and the like, e.g. forming connections on the links in the network 100, 300, 400, 500, 600. From a logical perspective, the line modules 720 provide ingress and egress ports to the node 700, and each line module 720 can include one or more physical ports. The switch modules 730 are configured to switch channels, wavelengths, timeslots, tributary units, packets, etc. between the line modules 420. For example, the switch modules 730 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 730 can include Time Division Multiplexed (TDM) (i.e., circuit switching) and/or packet switching engines. The switch modules 730 can include redundancy as well, such as 1:1, 1:N, etc.

Those of ordinary skill in the art will recognize the node 700 can include other components that are omitted for illustration purposes, and that the systems and methods described herein is contemplated for use with a plurality of different network elements with the node 700 presented as an exemplary type of a network element. For example, in another exemplary embodiment, the node 700 may not include the switch modules 730, but rather have the corresponding functionality in the line modules 720 (or some equivalent) in a distributed fashion. For the node 700, other architectures providing ingress, egress, and switching between the ingress and egress are also contemplated for the systems and methods described herein. In general, the systems and methods described herein contemplate use with any network element providing switching of channels, timeslots, tributary units, wavelengths, etc. and using the control plane. Furthermore, the node 700 is merely presented as one exemplary node 700 for the systems and methods described herein.

Exemplary Controller

Figure 7:
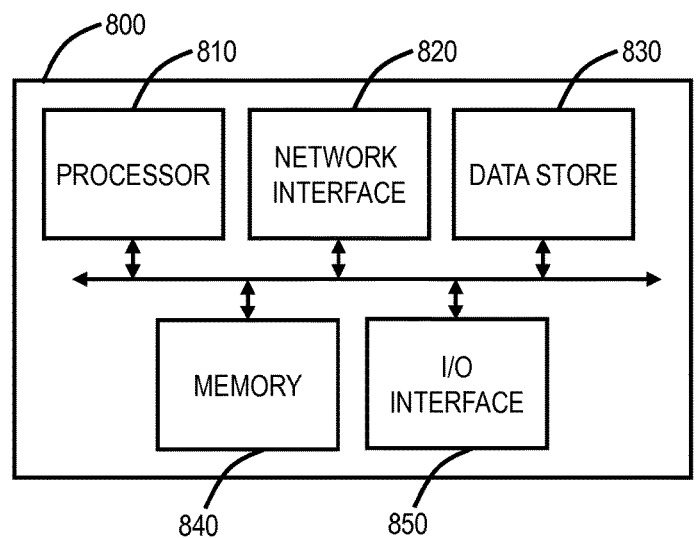
FIG. 7 is a block diagram of a controller to provide control plane processing and/or operations, administration, maintenance, and provisioning (OAM&P) for the node of FIG. 6.

Referring to FIG. 7, in an exemplary embodiment, a block diagram illustrates a controller 800 to provide control plane processing and/or operations, administration, maintenance, and provisioning (OAM&P) for the node 700. The controller 800 can be part of the common equipment, such as common equipment 710 in the node 700, or a stand-alone device communicatively coupled to the node 700 via the DCN 760. The controller 800 can include a processor 810 which is hardware device for executing software instructions such as operating the control plane. The processor 810 can be any custom made or commercially available processor, a central processing unit (CPU), an auxiliary processor among several processors associated with the controller 800, a semiconductor based microprocessor (in the form of a microchip or chip set), or generally any device for executing software instructions. When the controller 800 is in operation, the processor 810 is configured to execute software stored within memory, to communicate data to and from the memory, and to generally control operations of the controller 800 pursuant to the software instructions. The controller 800 can also include a network interface 820, a data store 830, memory 840, an Input/output (I/O) interface 850, and the like, all of which are communicatively coupled to one another and with the processor 810.

The network interface 820 can be used to enable the controller 800 to communicate on the DCN 760, such as to communicate control plane information to other controllers, to the management system 750, and the like. The network interface 820 can include, for example, an Ethernet card (e.g., 10BaseT, Fast Ethernet, Gigabit Ethernet) or a wireless local area network (WLAN) card (e.g., 802.11). The network interface 820 can include address, control, and/or data connections to enable appropriate communications on the network. The data store 830 can be used to store data, such as control plane information, provisioning data, OAM&P data, etc. The data store 830 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 830 can incorporate electronic, magnetic, optical, and/or other types of storage media. The memory 840 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 840 may incorporate electronic, magnetic, optical, and/or other types of storage media. Note that the memory 840 can have a distributed architecture, where various components are situated remotely from one another, but may be accessed by the processor 810. The I/O interface 850 includes components for the controller 800 to communicate with other devices. Further, the I/O interface 850 includes components for the controller 800 to communicate with the other nodes, such as using overhead associated with OTN, SONET, or SDH signals.

In an exemplary embodiment, the controller 800 is configured to communicate with other controllers 800 in the network 100 to operate the control plane 149 for control plane signaling. This communication may be either in-band or out-of-band. For SONET networks and similarly for SDH networks, the controllers 800 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 800 can include an in-band signaling mechanism utilizing OTN overhead. The General Communication Channels (GCC) defined by ITU-T Recommendation G.709 are in-band side channels used to carry transmission management and signaling information within Optical Transport Network elements. Other mechanisms are also contemplated for control plane signaling.

The controller 800 is configured to operate the control plane 140 in the network 100. That is, the controller 800 is configured to implement software, processes, algorithms, etc. that control configurable features of the network 100, such as automating discovery of the nodes, capacity on the links, port availability on the nodes, connectivity between ports; dissemination of topology and bandwidth information between the nodes; call management; path computation and creation for connections; network level protection and restoration; and the like. In an exemplary embodiment, the controller 800 can be configured to create a call with a non-preemptible component and a preemptible component, the compound SLA includes the non-preemptible component and the preemptible component, implement an endpoint for the call, wherein a corresponding node at another end of the call is configured to also implement the endpoint for the call, and responsive to a preemption event in the network, remove the preemptible component at the endpoints.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic. Of course, a combination of the approaches above may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby and are intended to be covered by the following claims.

What is claimed is:

1. A method, implemented in a network with a control plane, for creating a compound Service Level Agreement (SLA) call for a Time Division Multiplexing (TDM) service in the network, the method comprising:
creating the call with a non-preemptible component and a preemptible component, the compound SLA comprising the non-preemptible component and the preemptible component, wherein the call is an association between two or more users in the network, and the call is associated with zero or more connections in the network, each of the non-preemptible component and the preemptible component are formed by the zero or more connections;
implementing endpoints for the call at a source node and a destination node; and
responsive to a preemption event in the network, removing the preemptible component at the endpoints.

2. The method of claim 1, wherein Link Capacity Adjustment Scheme (LCAS) is used to manage removing the preemptible component at the endpoints.

3. The method of claim 1, wherein end-to-end call adjustment messages in the control plane are used to manage removing the preemptible component at the endpoints.

4. The method of claim 1, wherein the TDM service is implemented and managed, in the control plane, with heterogeneous attributes comprising the compound SLA.

5. The method of claim 1, wherein the TDM service is an Optical Transport Network (OTN) connection, and wherein each of the non-preemptible component and the preemptible component comprise one or more Optical channel Data Units (ODU)-based connections.

6. The method of claim 1, wherein the zero or more connections are either Subnetwork Connections (SNCs) or Label Switched Paths (LSPs).

7. The method of claim 1, wherein the call is utilized to provide router connectivity, each of the endpoints is communicatively coupled to a router, and wherein the source node and the destination node are configured to turn off ports facing the router when removing the preemptible component at the endpoints.

8. The method of claim 1, wherein the call is utilized to provide router connectivity, each of the endpoints is communicatively coupled to a router, and wherein a Link Aggregation Group (LAG) is implemented with the non-preemptible component and the preemptible component.

9. The method of claim 1, wherein the call is managed by the control plane with a plurality of Connection Termination Points (CTPs), the non-preemptible component has one or more CTPs set to no preemption and the preemptible component has one or more CTPs set to preemption.

10. A node, in a network with a control plane, configured to create a compound Service Level Agreement (SLA) call for a Time Division Multiplexing (TDM) service in the network, the node comprising:
one or more ports communicatively coupled to the network; and
a controller configured to
create the call with a non-preemptible component and a preemptible component, the compound SLA comprising the non-preemptible component and the preemptible component, wherein the call is an association between two or more users in the network, and the call is associated with zero or more connections in the network, each of the non-preemptible component and the preemptible component are formed by the zero or more connections,
implement an endpoint for the call, wherein a corresponding node at another end of the call is configured to also implement the endpoint for the call, and
responsive to a preemption event in the network, remove the preemptible component at the endpoints.

11. The node of claim 10, wherein Link Capacity Adjustment Scheme (LCAS) is used to manage removing the preemptible component at the endpoints.

12. The node of claim 10, wherein end-to-end call adjustment messages in the control plane are used to manage removing the preemptible component at the endpoints.

13. The node of claim 10, wherein the TDM service is implemented and managed, in the control plane, with heterogeneous attributes comprising the compound SLA.

14. The node of claim 10, wherein the TDM service is an Optical Transport Network (OTN) connection, and wherein each of the non-preemptible component and the preemptible component comprise one or more Optical channel Data Units (ODU)-based connections.

15. The node of claim 10, wherein the call is utilized to provide router connectivity, each of the endpoints is communicatively coupled to a router, and wherein the source node and the destination node are configured to turn off ports facing the router when removing the preemptible component at the endpoints.

16. The node of claim 10, wherein the call is utilized to provide router connectivity, each of the endpoints is communicatively coupled to a router, and wherein a Link Aggregation Group (LAG) is implemented with the non-preemptible component and the preemptible component.

17. The node of claim 10, wherein the call is managed by the control plane with a plurality of Connection Termination Points (CTPs), the non-preemptible component has one or more CTPs set to no preemption and the preemptible component has one or more CTPs set to preemption.

18. A method, implemented in a network with a control plane, for creating a compound Service Level Agreement (SLA) call for a Time Division Multiplexing (TDM) service in the network, the method comprising:
creating the call with a non-preemptible component and a preemptible component, the compound SLA comprising the non-preemptible component and the preemptible component, wherein the call is managed by the control plane with a plurality of Connection Termination Points (CTPs), the non-preemptible component has one or more CTPs set to no preemption and the preemptible component has one or more CTPs set to preemption;
implementing endpoints for the call at a source node and a destination node; and
responsive to a preemption event in the network, removing the preemptible component at the endpoints.

19. The method of claim 18, wherein Link Capacity Adjustment Scheme (LCAS) is used to manage removing the preemptible component at the endpoints.

20. The method of claim 18, wherein end-to-end call adjustment messages in the control plane are used to manage removing the preemptible component at the endpoints.

* * * * *